United States Patent
Chen (10) Patent No.: US 9,853,905 B2
(45) Date of Patent: Dec. 26, 2017

(54) SYSTEM AND METHOD FOR WIRELESS CONNECTED DEVICE PRIORITIZATION IN A VEHICLE

(71) Applicant: Honda Motor Co., Ltd., Tokyo (JP)

(72) Inventor: Bonnie Chen, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 79 days.

(21) Appl. No.: 14/848,734

(22) Filed: Sep. 9, 2015

(65) Prior Publication Data

US 2016/0294707 A1    Oct. 6, 2016

Related U.S. Application Data

(60) Provisional application No. 62/142,288, filed on Apr. 2, 2015.

(51) Int. Cl.
*H04L 12/851* (2013.01)
*H04W 28/02* (2009.01)
(Continued)

(52) U.S. Cl.
CPC ............ *H04L 47/24* (2013.01); *G07C 5/08* (2013.01); *H04L 67/12* (2013.01); *H04W 8/24* (2013.01);
(Continued)

(58) Field of Classification Search
CPC .......... H04L 47/24; H04L 67/12; G07C 5/08; H04W 28/0215; H04W 28/0231; H04W 8/24; H04W 8/005
See application file for complete search history.

(56) References Cited

U.S. PATENT DOCUMENTS 6,265,978 B1   7/2001 Atlas
6,599,243 B2   7/2003 Woltermann et al.
(Continued)

FOREIGN PATENT DOCUMENTS

WO   2006079475   8/2006
WO   2014085302   6/2014

OTHER PUBLICATIONS

Article: Hiner, J: "Ford to use wearables to improve health and safety in cars" http://www.zdnet.com/ford-to-use-wearables-to-improve-health-and-safety-in-cars-7000030997/, Jun. 27, 2014, 3 pages.

(Continued)

*Primary Examiner* — Mohammad Adhami
*Assistant Examiner* — Shailendra Kumar
(74) *Attorney, Agent, or Firm* — Rankin, Hill & Clark LLP (57) ABSTRACT

A method and system for managing electronic devices in a vehicle including establishing operable connections for computer communication between electronic devices and the vehicle in a vehicle network and communicating device characteristics between each electronic device and the vehicle. The device characteristics are stored at a data storage device and the device characteristics include at least one or more data types capable of transmission between each electronic device and the vehicle. Assigning a priority to each electronic device based on the device characteristics and a priority rules set stored at the data storage device and controlling data transmission between each electronic device and the vehicle based on the priority.

15 Claims, 6 Drawing Sheets

(51) Int. Cl.
  *H04W 8/24* (2009.01)
  *G07C 5/08* (2006.01)
  *H04L 29/08* (2006.01)
  *H04W 8/00* (2009.01)

(52) U.S. Cl.
  CPC ... *H04W 28/0215* (2013.01); *H04W 28/0231* (2013.01); *H04W 8/005* (2013.01)

(56) References Cited

U.S. PATENT DOCUMENTS

| | | |
|---|---|---|
| 7,936,885 B2 | 5/2011 | Frank et al. |
| 8,000,894 B2 | 8/2011 | Taylor et al. |
| 8,040,246 B2 | 10/2011 | Graves et al. |
| 8,078,334 B2 | 12/2011 | Goodrich |
| 8,204,786 B2 | 6/2012 | LeBoeuf et al. |
| 8,306,235 B2 | 11/2012 | Mahowald |
| 8,702,250 B2 | 4/2014 | Raz et al. |
| 8,704,669 B2 | 4/2014 | Strumolo |
| 8,781,568 B2 | 7/2014 | Dugan et al. |
| 2007/0000709 A1 | 1/2007 | Danger et al. |
| 2008/0015422 A1 | 1/2008 | Wessel |
| 2008/0238667 A1 | 10/2008 | Olson et al. |
| 2008/0297336 A1* | 12/2008 | Lee .................. B60H 1/00742 340/439 |
| 2010/0130808 A1 | 5/2010 | Hattori |
| 2010/0268051 A1 | 10/2010 | Prasad et al. |
| 2010/0312142 A1 | 12/2010 | Demirdjian et al. |
| 2012/0105637 A1* | 5/2012 | Yousefi .................. H04N 7/183 348/148 |
| 2012/0171982 A1 | 7/2012 | Schunder et al. |
| 2012/0256749 A1 | 10/2012 | Rao et al. |
| 2012/0296567 A1 | 11/2012 | Breed |
| 2012/0313792 A1* | 12/2012 | Behm .................. G08G 1/0965 340/902 |
| 2012/0316455 A1 | 12/2012 | Rahman et al. |
| 2013/0009761 A1 | 1/2013 | Horseman |
| 2013/0038437 A1* | 2/2013 | Talati .................. B60K 35/00 340/438 |
| 2013/0134730 A1 | 5/2013 | Ricci |
| 2013/0144470 A1 | 6/2013 | Ricci |
| 2013/0225261 A1 | 8/2013 | Cruz-Hernandez |
| 2013/0231800 A1 | 9/2013 | Ricci |
| 2014/0057563 A1* | 2/2014 | Salahshoor .......... H04W 84/20 455/41.2 |
| 2014/0059066 A1 | 2/2014 | Koloskov |
| 2014/0119563 A1 | 5/2014 | Caskey et al. |
| 2014/0164582 A1* | 6/2014 | Dawson ................ H04W 48/18 709/221 |
| 2014/0179256 A1 | 6/2014 | Strumolo |
| 2015/0222707 A1* | 8/2015 | Goldstein ............. H04L 45/302 455/517 |
| 2016/0255015 A1* | 9/2016 | Hrabak ................. H04L 47/805 |

OTHER PUBLICATIONS

"The Dash Listen. Track. Communicate." http://cdn.shopify.com/s/files/1/0393/7549/files/6b29ce3aa93db8f58e1a2b1728b05986.jpg?497,2014.

Dvorak, J.: "Chapter 2.2.3 and 2.2.4" Moving Wearables into the Mainstream: Taming the Borg. New York: Springer, 2008. pp. 33-37.

Blog: AmyT: "NewsFlash: Ford & Medtronic Demonstrate In-Car Glucose Monitoring", http://www.diabetesmine.com/2011/05/newsflash-ford-medtronic-demonstrate-in-car-glucose-monitoring.html, May 19, 2011.

Article: Gibbs, S.: "Google calls for guinea pigs for ambitious 'Baseline' health study", theguardian.com, Jul. 28, 2014.

Article: Manik, R.: "Wanted: Technologies to Enable the Connected Car", http://autotechreview.com/latest-issue/item/1279-wanted-technologies-to-enable-the-connected-car.html, May 8, 2014.

Article: Warren, C.: "Nissan Introduces a Smart Watch. Seriously." http://mashable.com/2013/09/09/nissan-nismo-smart-watch/, Sep. 9, 2013.

* cited by examiner

| CONNECTED DEVICE ID | CONNECTED DEVICE TYPE | CONNECTION TYPE | DEVICE LOCATION | DATA TYPES | OTHER |
|---|---|---|---|---|---|
| 1W | WEARABLE | WIFI | REAR SEAT, RIGHT SIDE | HEALTH; ACTIVITY; NOTIFICATIONS | CHILD |
| 2S | SMART PHONE | BLUETOOTH | REAR SEAT, LEFT SIDE | NOTIFICATIONS; REMOTE; STREAMING | TEEN |
| 3M | MP3 PLAYER | NFC | REAR SEAT, LEFT SIDE | STREAMING | TEEN |
| 4S | SMART PHONE | WIFI | PASSENGER SEAT | HEALTH; ACTIVITY; NOTIFICATIONS; STREAMING | SENIOR |
| 5W | FITNESS BAND | BLUETOOTH | DRIVER SEAT | HEALTH; ACTIVITY | ADULT |
| 6W | DOG COLLAR | WIFI | CARGO AREA | HEALTH; ACTIVITY | ANIMAL |

| CONNECTION SLOT | CONNECTED DEVICE ID | PRIORITY |
|---|---|---|
| 1 | 1W | 4 |
| 2 | 2S | 3 |
| 3 | 3M | 2 |
| 4 | 4S | 1 |
| 5 | 5W | 5 |
| 6 | 6W | 6 |
| 7 | AVAILABLE | AVAILABLE |

| CONNECTION SLOT | CONNECTED DEVICE ID | PRIORITY |
|---|---|---|
| 1 | 1W | 5 |
| 2 | 2S | 3 |
| 3 | 3M | 1 |
| 4 | 4S | 2 |
| 5 | 5W | 4 |
| 6 | 6W | 0 |
| 7 | AVAILABLE | AVAILABLE |

FIG. 7B

SYSTEM AND METHOD FOR WIRELESS CONNECTED DEVICE PRIORITIZATION IN A VEHICLE

RELATED APPLICATIONS

This application claims priority to U.S. Provisional Application Ser. 62/142,288 filed on Apr. 2, 2015.

BACKGROUND

Connected vehicle technology provides limited connectivity of an electronic device to a primary wireless connection, not multiple wireless connections using different wireless protocols. For example, an electronic device can be connected to a vehicle via a first wireless technology (e.g., Bluetooth) or a second wireless technology (e.g., Wi-Fi). However, multiple electronic devices using different wireless protocols can be available to a vehicle and provide different types of information to the vehicle. For example, a vehicle is capable of connecting to one or more electronic devices, such as, a personal electronic device, a smart phone, a tablet, a wearable computing device, among others. The electronic devices can be associated with and/or in possession of one or more vehicle occupants or other biological beings. By handling multiple connections to multiple electronic devices, the vehicle can optimize the information available from the electronic devices in an efficient manner.

BRIEF DESCRIPTION

According to one aspect, a method for managing electronic devices in a vehicle includes establishing operable connections for computer communication between electronic devices and the vehicle in a vehicle network and communicating device characteristics between each electronic device and the vehicle. The device characteristics are stored at a data storage device and the device characteristics include at least one or more data types capable of transmission between each electronic device and the vehicle. The method includes assigning a priority to each electronic device based on the device characteristics and a priority rules set stored at the data storage device and controlling data transmission between each electronic device and the vehicle based on the priority.

According to another aspect, a system for managing electronic devices in a vehicle includes a processor and a wireless connection module executable by the processor that establishes operable connections for computer communication between electronic devices and the vehicle in a vehicle network. The wireless connection module identifies device characteristics for each electronic device. The device characteristics include at least one or more data types capable of transmission between each electronic device and the vehicle. The system includes a prioritization module executable by the processor that assigns a priority to each electronic device based on the device characteristics and a priority rules set stored at a data storage device. The data storage device is operably connected for computer communication to the processor. The wireless connection module executable by the processor controls data transmission between each electronic device and the vehicle based on the priority assigned by the prioritization module.

According to a further aspect, a non-transitory computer-readable storage medium storing instructions that, when executed by a computer, causes the computer to perform a method that includes establishing operable connections for computer communication between electronic devices and a vehicle in a vehicle network and receiving device characteristics between each electronic device and the vehicle. The method includes storing the device characteristics at a data storage device. The device characteristics include one or more data types capable of transmission between each electronic device and the vehicle. The method includes determining a priority for each electronic device based on the device characteristics and a priority rules set and controlling data transmission between each electronic device and the vehicle based on the priority.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device" and/or an "electronic device" as used herein, is a computing device typically having a display screen with user input (e.g., touch, keyboard) and a processor for computing. Portable devices include, but are not limited to, handheld devices, mobile devices, smart phones, laptops, tablets, wearable computing devices, and e-readers.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system", as used herein can include, but is not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "vehicle occupant", as used herein can include, but is not limited to, one or more biological beings located in the vehicle. The vehicle occupant can be a driver or a passenger of the vehicle. The vehicle occupant can be a human (e.g., an adult, a child, an infant) or an animal (e.g., a pet, a dog, a cat).

A "wearable computing device", as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Some wearable computing devices have user input and output functionality. Exemplary wearable computing devices can include, but are not limited to, watches, glasses, clothing, gloves, hats, shirts, jewelry, rings, earrings necklaces, armbands, shoes, earbuds, headphones, personal wellness devices, collars, and leashes.

Figure 1:
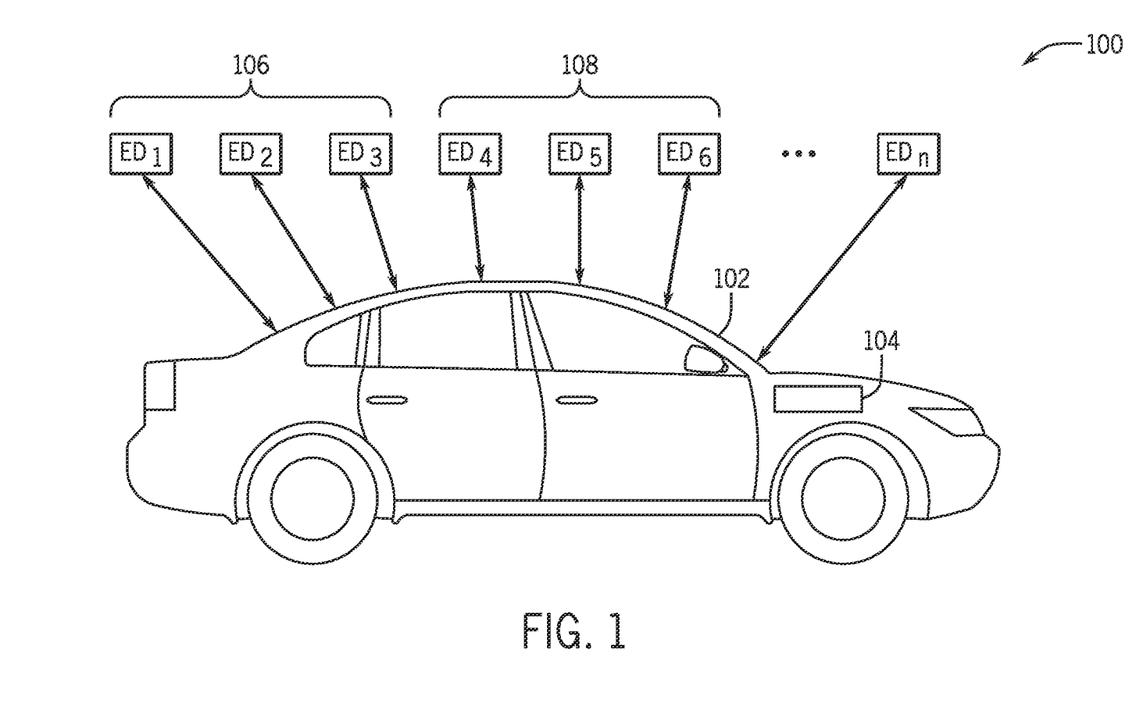
FIG. 1 is a schematic diagram of a vehicle operably connected for computer communication with electronic devices according to an exemplary embodiment.

Referring now to the drawings, wherein the showings are for purposes of illustrating one or more exemplary embodiments and not for purposes of limiting same, FIG. 1 is a schematic diagram of a system 100 for managing electronic devices with a vehicle 102. In FIG. 1, the vehicle 102 includes a vehicle computing device 104 (VCD) (e.g., a telematics unit, a head unit, an electronic control unit) that includes hardware and software for managing connections of electronic devices $ED_1 \ldots ED_n$ (e.g., a plurality of electronic devices, one or more electronic devices) to the vehicle 102. The electronic devices $ED_1 \ldots ED_n$ are operably connected for computer communication to the vehicle 102, for example, via the VCD 104. For example, the electronic devices $ED_1 \ldots ED_n$ each have an operable wireless connection (indicated by arrows) to the vehicle 102. The electronic devices $ED_1 \ldots ED_n$, the vehicle 102, the VCD 104 and connections thereto can be part of a vehicle network, allowing for data transmission between components of the vehicle network.

The electronic devices $ED_1 \ldots ED_n$ can include portable devices, smart devices, mobile phones, wearable computing devices, among others. The electronic devices $ED_1 \ldots ED_n$ can be associated with a user and/or in possession of a user. The user can be a vehicle occupant located in the vehicle 102. In some embodiments, one or more of the electronic devices $ED_1 \ldots ED_n$ can be associated and/or in possession of different users. In some embodiments, more than one electronic device $ED_1 \ldots ED_n$ can be associated and/or in the possession of the same user.

In FIG. 1, each wireless connection from the electronic devices $ED_1 \ldots ED_n$ to the vehicle 102 are facilitated by a wireless protocol, for example Bluetooth, Wi-Fi. Accordingly, the systems and methods discussed herein can manage connections of electronic devices with different types (e.g., more than one type) of wireless protocols between the electronic devices $ED_1 \ldots ED_n$ and the vehicle 102. For purposes of illustration in FIG. 1, the electronic devices 106 (i.e., $ED_1 \ldots ED_3$) are operably connected for computer communication to the vehicle 102 using Bluetooth. The electronic devices 108 (i.e., $ED_4 \ldots ED_6$) are operably connected for computer communication to the vehicle 102 using Wi-Fi. It is understood that the electronic devices can be operatively connected for computer communication to the vehicle 102 using other wireless technologies, for example near field communication (NFC), ZigBee, cellular data connections, mobile satellite communications, among others.

Figure 2:
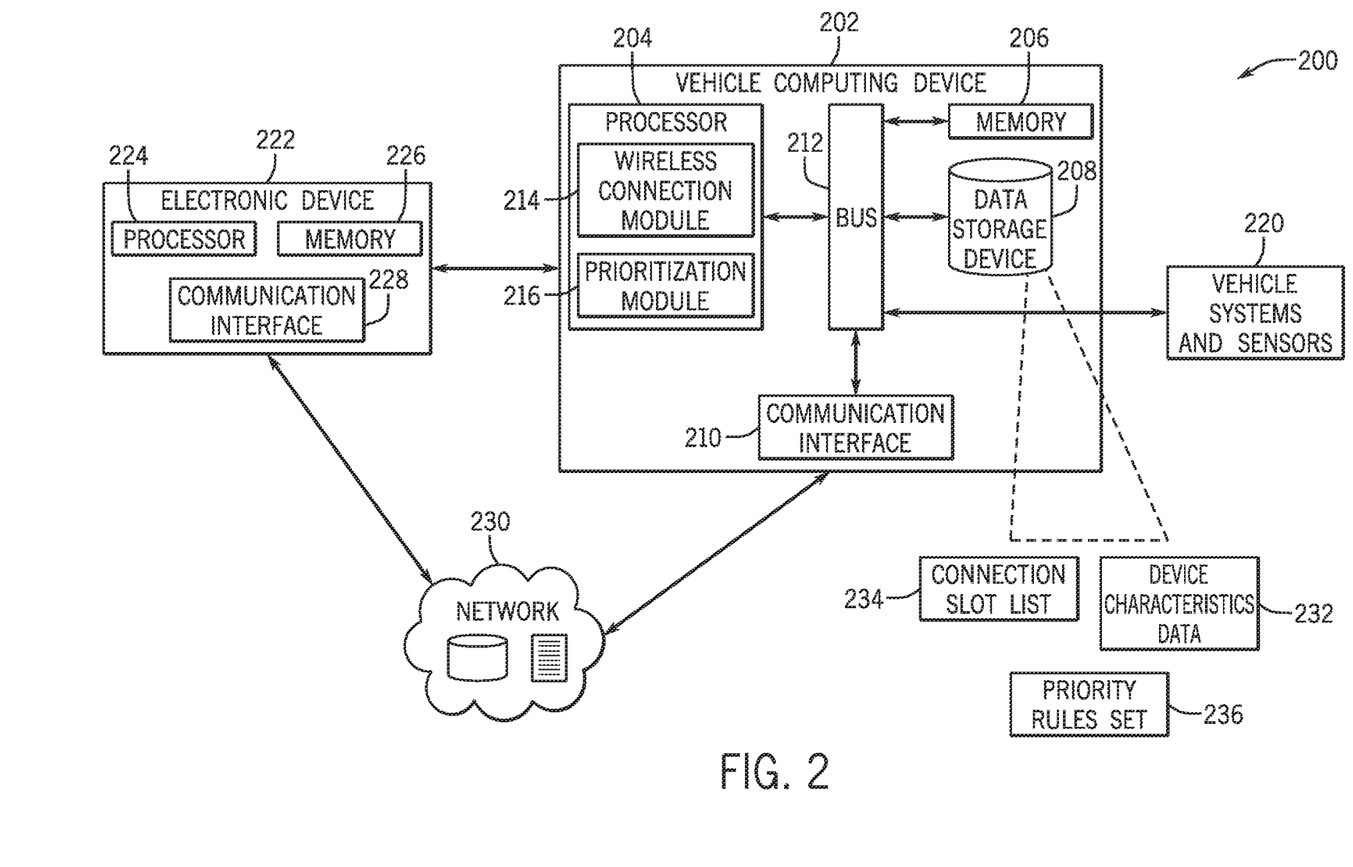
FIG. 2 is a block diagram of an illustrative system for managing the electronic devices with the vehicle of FIG. 1 according to an exemplary embodiment.

Generally, the VCD 104 can manage data transmission between each electronic device $ED_1 \ldots ED_n$ and the vehicle 102. For example, the VCD 104 can control data throughput for each electronic device $ED_1 \ldots ED_n$ based on device characteristics, which will be described in more detail herein. Accordingly, the VCD 104 can optimize data transfer and the data available from each of the electronic devices $ED_1 \ldots ED_n$. The system 100 of FIG. 1 will now be described in more detail with reference to FIG. 2. FIG. 2 illustrates a block diagram of an illustrative system 200 for managing electronic devices with the vehicle 102 of FIG. 1 according to an exemplary embodiment. The components of the system 200, as well as the components of other systems, hardware architectures, and software architectures discussed herein, can be combined, omitted, or organized into different architectures for various embodiments. FIG. 2 will be described with reference to components of FIG. 1.

Similar to FIG. 1, the system 200 includes a vehicle computing device (VCD) 202 with provisions for processing, communicating and interacting with various components of the vehicle 102 and other components of the system 200. In one embodiment, the VCD 202 can be implemented with the vehicle 102 (e.g., VCD 104), for example, as part of a telematics unit, a head unit, an electronic control unit, among others. In other embodiments, the VCD 202 can be implemented remotely from the vehicle 102, for example, with an electronic device or another device connected via a network.

Generally, the VCD 202 can include various components such as a processor 204, a memory 206, a data storage device 208 (e.g., a data store, a disk, which can be on-board or off-board the vehicle) and a communication interface 210, which are each operably connected for computer communication via a bus 212 and/or other wired and wireless technologies. The communication interface 210 provides software and hardware to facilitate data input and output between the components of the VCD 202 and other components, networks, and data sources described herein. In FIG. 2, the processor 204 includes a wireless connection module 214 and a prioritization module 216 that facilitate managing electronic devices connections with the vehicle 102. In some embodiments, the wireless connection module 214 and/or the prioritization module 216 can be part of the memory 206 and/or the communication interface 210.

The VCD 202 is also operably connected for computer communication to one or more vehicle systems and sensors 220. Vehicle systems can include, but are not limited to, any automatic or manual systems that can be used to enhance the vehicle, driving, and/or safety. The VCD 202 can receive vehicle data (e.g., data about one or more vehicle systems, data about the vehicle environment) from the vehicle systems and sensors 220. As discussed above with FIG. 1, the VCD 202 is also operatively connected for computer communication to electronic devices. In FIG. 2, the VCD 202 is operably connected for computer communication to an electronic device 222. For simplicity, one electronic device is shown in FIG. 2. However, it is understood that multiple electronic devices (e.g., more than one electronic device $ED_1 \ldots ED_n$), as shown in FIG. 1, can be implemented with the components of FIG. 2.

Similar to the VCD 202, the electronic device 222 can include a processor 224, a memory 226 and a communication interface 228. The electronic device 222 can also include other hardware and software components not shown. It is understood that the components of the electronic device 222 can be the same or similar to components in any of the electronic devices $ED_1 \ldots ED_n$ operably connected for computer communication to the vehicle 102. The connection between the VCD 202 and the electronic device 222 can be facilitated in various ways. The communication interface 210 can maintain a vehicle network between the VCD 202, the electronic device 222, the network 230 and other components of the vehicle 102. The vehicle network is a communication network allowing data transmission between these components and the vehicle 102.

The network 230 is, for example, a data network, the Internet, a wide area network or a local area network. The network serves as a communication medium to various remote devices (e.g., databases, web servers, remote servers, application servers, intermediary servers, client machines, other portable devices). As discussed above, in some embodiments, electronic device 222 can be included in the network 230, accessed by the VCD 202 through the network 230, and/or the network 230 can access the electronic device 222. Thus, as will be described herein, the VCD 202 can stream, transmit, and receive data between the VCD 202 and the electronic device 222 either directly or via the network 230.

As will be described in detail herein, the VCD 202 can establish connections between each electronic device $ED_1 \ldots ED_n$ and the vehicle 102 based, in part, on a connection slot list 232 stored at the data storage device 208.

For example, establishing connections between the electronic devices and the vehicle can include determining if a connection slot is available (e.g., open) on a connection slot list 232. Further, the VCD 202 can manage data transmission between each electronic device $ED_1 \ldots ED_n$ and the vehicle 102 based, in part, on device characteristics data 234 and a priority rules set 236, both of which can be stored at the data storage device 208. It is understood the connection slot list 232, the device characteristics data 234 and/or the priority rules set 236 can be stored at the memory 206 and/or can be stored off-board the vehicle 102, for example, in a data storage device accessed via the network 230.

Figure 3:
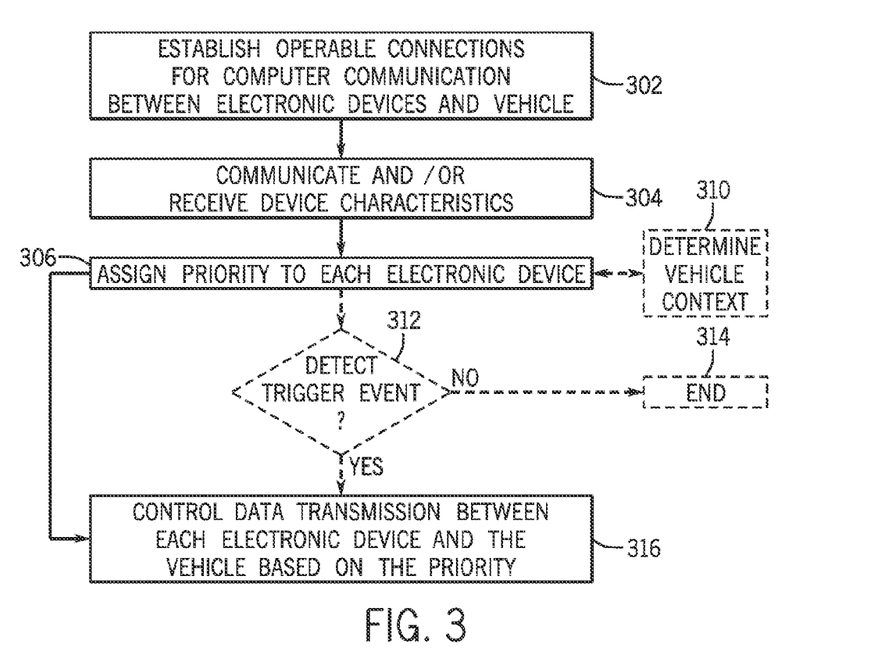
FIG. 3 is a process flow diagram of managing electronic devices with a vehicle according to an exemplary embodiment.

The operation of the components shown in FIGS. 1 and 2 will now be described with reference to FIG. 3. FIG. 3 is a process flow diagram illustrating managing electronic devices with a vehicle according to an exemplary embodiment. At block 302, the method includes establishing operable connections for computer communication between electronic devices and the vehicle in a vehicle network. For example, the wireless connection module 214 executable by the processor 204 establishes operable connections for computer communication between electronic devices $ED_1 \ldots ED_n$ and the vehicle 102 in a vehicle network. As discussed above, the communication interface 210 can maintain a vehicle network between the VCD 202, the electronic device 222, the network 230 and other components of the vehicle 102. The vehicle network is a communication network allowing data transmission between these components and the vehicle 102.

Further, at block 304, the method includes communicating device characteristics between each electronic device and the vehicle. The device characteristics are stored at a data storage device. The device characteristics can include at least one or more data types capable of transmission between each electronic device and the vehicle. In some embodiments, the method can include receiving and/or identifying device characteristics from each electronic device at the vehicle. In one embodiment, the wireless connection module 214 receives device characteristics for each electronic device. In another embodiment, the wireless connection module 214 receives device characteristics for each electronic device from the data storage device 208 (e.g., stored as device characteristics data 234). The wireless connection module 214 can store and/or retrieve the device characteristics at the data storage device 208 (e.g., stored as device characteristics data 234). The device characteristics can include data about the electronic device and/or a user associated (e.g., owned, in possession of) the electronic device. In some embodiments, the device characteristics can be stored in the memory 206 and/or the data storage device 208. In FIG. 2, the device characteristics are stored as device characteristics data (e.g., electronic device data) 234 in the data storage device 208.

Figure 6:
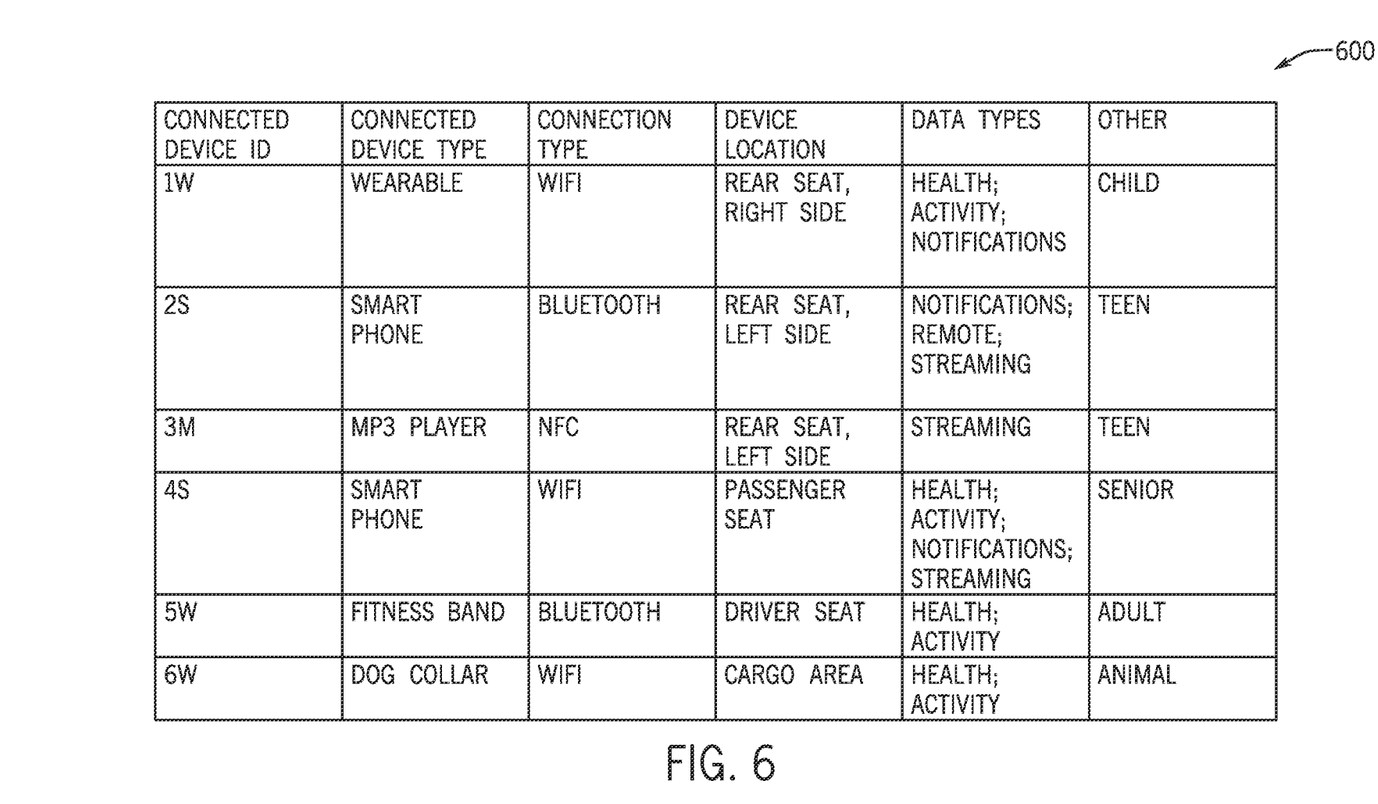
FIG. 6 is a table illustrating exemplary electronic device data (e.g., device characteristics) stored at a data storage device according to an exemplary embodiment.

Referring now to FIG. 6, a table of exemplary device characteristics data 234 stored at the data storage device 208 according to an exemplary embodiment is shown. The table 600 and the device characteristics data shown in the table 600 is illustrative in nature and it is understood that other types of data and examples can be implemented. The data storage device 208 can store all relevant information (e.g., device characteristics data 234) about each electronic device's connection (e.g., pairing codes, IMEI, serial number, data types available, wireless (e.g., Bluetooth, Wi-Fi) capabilities). This information can include both active devices (e.g., currently connected for computer communication) and non-active devices (e.g., not currently connected for computer communication, but were connected at some point in time with the vehicle 102). It is understood, that in some embodiments, some or all of the device characteristics data 234, can be stored off-board the vehicle and/or in the memory 206.

As shown in FIG. 6, a connected device ID associated with the electronic device is stored. The connected device ID can be received from each of the plurality of electronic devices. Alternatively, the wireless connection module 214 can assign a connected device ID to each of the plurality of electronic devices. In table 600, the device characteristics include a connected device type, a connection type, a device location, data types, and other characteristics. The connected device type identifies the type of electronic device. For example, a wearable computing device, a smart phone, a fitness band, a smart watch, an MP3 player, a dog collar, among others. The connection type identifies the type of wireless connection active between the vehicle and the electronic devices. For example, Wi-Fi, Bluetooth, NFC, among others.

The device location defines the location of the electronic device in the vehicle. The device location in table 600 is a textual description with respect to the vehicle. However, the device location received from the electronic device (e.g., as device characteristic data) can be numerical. For example, coordinates, degrees, radians, among others. In some embodiments, the wireless connection module 214 can determine the device location relative to the vehicle based on the numerical location data and vehicle location data. In other embodiments, the device location could include motion information.

The data type identifies data type(s) provided by the electronic device and/or data type(s) capable of being provided and/or sensed by the electronic device. Thus, the device characteristics include at least one or more data types capable of transmission between each electronic device and the vehicle. For example, a data type can be a health data type that provides health information (e.g., heart rate, breath rate, respiratory rate, sweat data, among other types of physiological, biological, and autonomic health information) from the electronic device. For example, a fitness band can provide health data, among others. A data type can be an activity data type that provides activity information (e.g., accelerometer information, directional information) from the electronic device. For example, a smart phone can provide motion data, among others.

A data type can be a notification and/or an alert that provides notifications and/or alerts (e.g., reminders, alarms, notifications from applications on the electronic device) from the electronic device. For example, a smart phone can provide a calendar notification, an alarm alert, among others. A data type can be a streaming data type that provides streaming media information (e.g., music, videos, and other media content) from the electronic device. For example, an MP3 player can provide streaming audio content, among others. A data type can be a remote control data type that provides remote control of one or more features (e.g., controls vehicle features) from the electronic device. For example, a smart phone can provide remote control of a vehicle infotainment system, among others.

Further, other types of data can be received and stored from each of the plurality of electronic devices. These other types of data can be categorized as a data type (e.g., demographic data type, social media data type) or can be stored separately as shown in FIG. 6. In FIG. 6, the table 600 includes other characteristics received from each of the electronic devices. For example, an age and/or type of biological being associated with each of the plurality of electronic devices. As will be discussed in further detail herein, the device characteristics data of each of the plurality of electronic devices can be used to assign a priority to each of the electronic devices.

Figure 4:
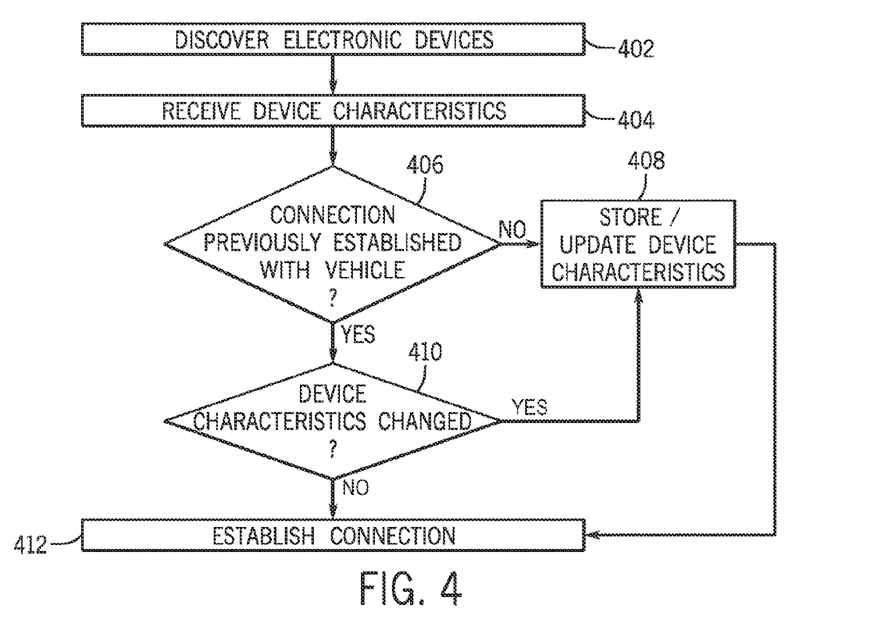
FIG. 4 is a process flow diagram of establishing operable connections between electronic devices and the vehicle according to an exemplary embodiment.

Referring again to FIG. 3, blocks 302 and 304 will now be described in more detail with FIGS. 4 and 5. FIG. 4 is a process flow diagram of establishing operable connections between electronic devices and the vehicle according to an exemplary embodiment. At block 402, the method can include discovering one or more electronic devices. For example, the wireless connection module 214 and/or the communication interface 210 can be set to a discovery mode searching for electronic devices to connect to the VCD 202. In some embodiments, an electronic device can transmit a request to the VCD 202 to establish a connection. It is understood that various techniques can be used to identify and connect electronic devices $ED_1 \ldots ED_n$ to the VCD 202. Block 402 will be discussed in further detail herein with FIG. 5.

At block 404, as discussed above with FIG. 3, the method includes receiving device characteristics. For example, the wireless connection module 214 can receive a device ID from one or more of the electronic devices. In other embodiments, the wireless connection module 214 can receive a device ID and other device characteristics (discussed above) from one or more electronic devices $ED_1 \ldots ED_n$. At block 406, it is determined if a connection has been previously established with the vehicle. For example, the wireless connection module 214 can transmit a query to the data storage device 208 (e.g., the device characteristics data 234) with the device ID to determine if a connection has previously been established between the electronic device and the vehicle 102. If the determination at block 406 is NO, the method includes at block 408, storing the device characteristics. For example, the wireless connection module 214 can store the device characteristics at the data storage device 208 as device characteristics data 234. Upon storing the device characteristics, the method can proceed to block 412.

If the determination at block 406 is YES, the wireless connection module 214 can determine if the device characteristics have changed at block 410. For example, the wireless connection module 214 can compare the device characteristics received at block 404 with the device characteristics stored at the data storage device 208 for the particular device (e.g., by querying the data storage device 208 with the device ID). If the determination at block 410 is YES, the method includes at block 408, storing and/or updating the device characteristics as discussed above. Upon storing and/or updating the device characteristics, the method can proceed to block 412. If the determination at block 410 is NO, the method can proceed to block 412 including establishing a connection between the electronic device and the vehicle. It is appreciated that transmission of some or all device characteristics can occur after establishing a connection at block 412.

Figure 5:
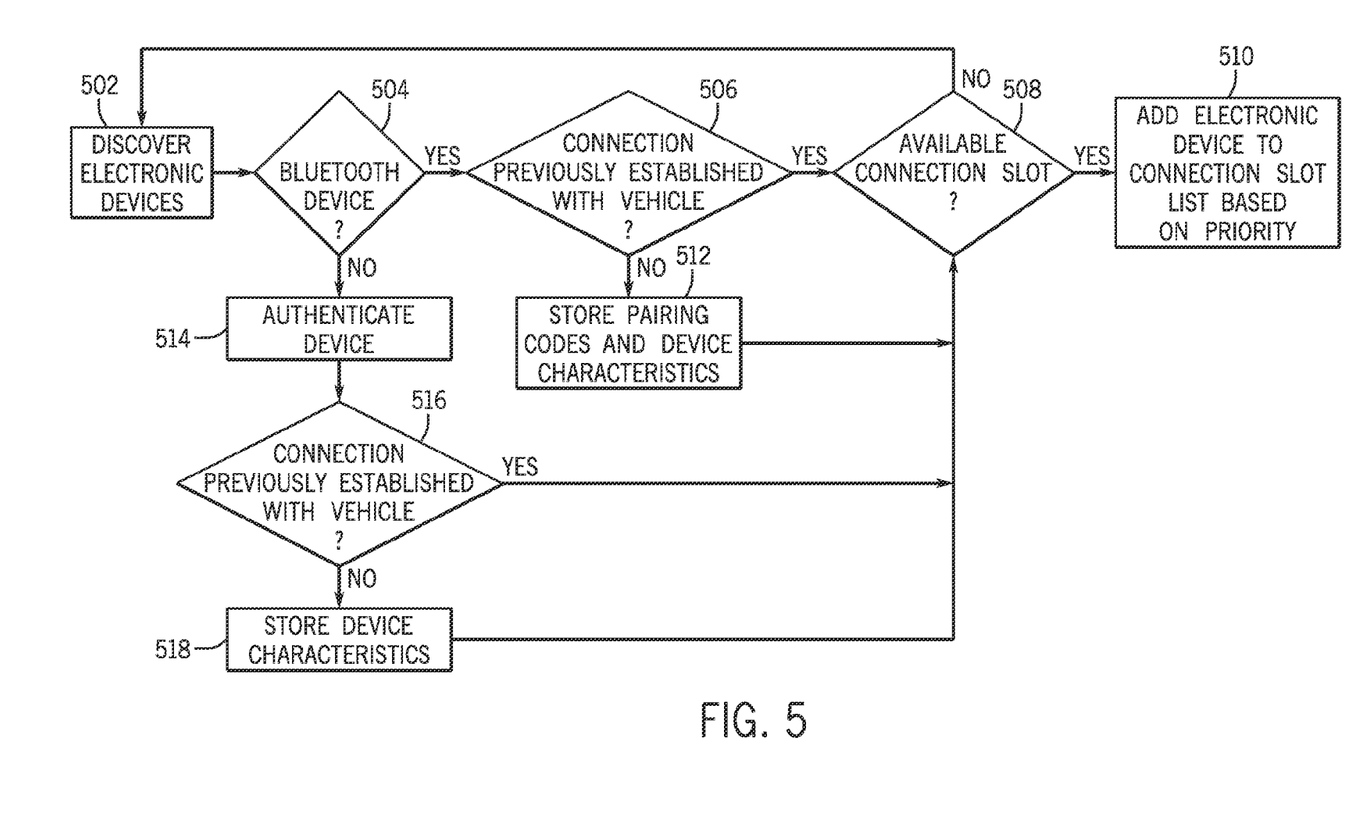
FIG. 5 is a process flow diagram of a detailed process for establishing operable connections between electronic devices and the vehicle of the method shown in FIG. 4 according to an exemplary embodiment.

Referring now to FIG. 5, a process flow diagram of a detailed process for establishing operable connections between electronic devices and the vehicle of the method shown in FIG. 4 according to an exemplary embodiment. Although the process flow chart of FIG. 5 provides separate processes for devices based on the connection type (e.g., Bluetooth, Wi-Fi), the blocks of the processes can be combined, omitted or applied to other connection types. At block 502, the wireless connection module 214 can initiate a discovery process for electronic devices to connection the vehicle 102. For example, the wireless connection module 214 can initiate a search for electronic devices 106 with Bluetooth connectivity and/or electronic devices 108 with Wi-Fi connectivity. At block 504, it is determined if the electronic device is a Bluetooth device (i.e., with Bluetooth connectivity). If the determination is YES, at block 506, it is determined if the electronic device has previously established a connection with the vehicle. For example, as described above, device characteristics (e.g., device ID, pairing codes) received from the electronic device can be used to query the data storage device 208 to determine if the device characteristics data 234 includes data matching the device characteristics for the electronic device.

Figure 7A:
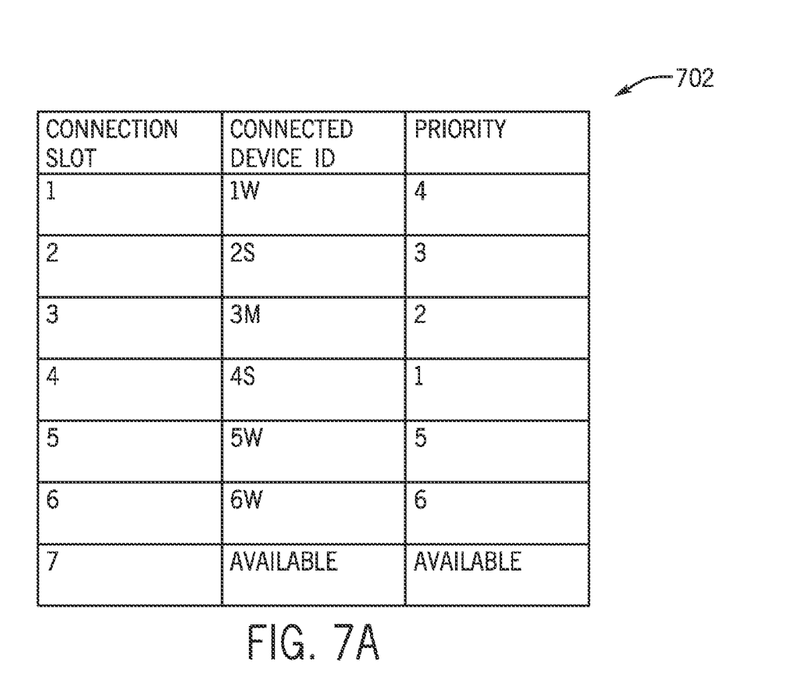
FIG. 7A is a table illustrating an exemplary connection slot list with priority information stored at a data storage device according to an exemplary embodiment.
Figure 7B:
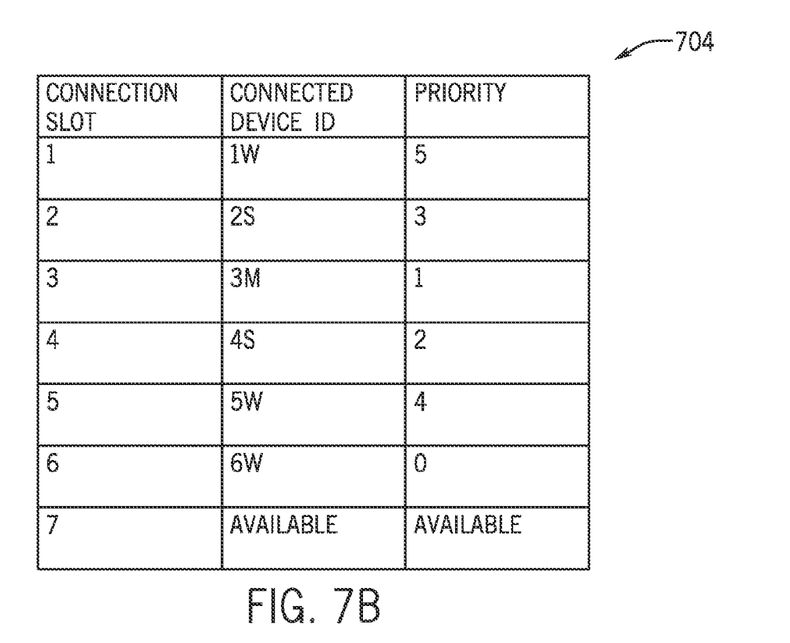
FIG. 7B is a table illustrating another exemplary connection slot list with priority information stored at a data storage device according to another exemplary embodiment.

If the determination at block 506 is YES, at block 508 it is determined if a connection slot is available (e.g., open). The wireless connection module 214 can query the connection slot list 232 to determine if a connection slot is available. The connection slot list 232 manages all the active devices currently connected to the vehicle 102. Thus, when an electronic device connects to the vehicle 102, if a slot is available in the connection slot list 232, the connection is stored in the connection slot list 232. As will be discussed herein, the connection slot list 232 can include and store priority information. FIGS. 7A and 7B illustrate exemplary illustrative connection slot lists with priority information according to an exemplary embodiment that will be discussed in further detail herein.

If the determination at block 508 is YES, at block 510, the electronic device is added to the connection slot list and an operable connection for computer communication between the electronic device and the vehicle is established. In some embodiments, which will be described herein, the electronic device and a priority assigned to the electronic device is stored in the connection slot list.

Returning to block 506, if the determination is NO (i.e., the electronic device has not previously established a connection with the vehicle), the method proceeds to block 512 where the wireless connection module 214 stores the device characteristics of the electronic device at the data storage device 208. Thereafter, the process can continue to blocks 508 and 510 as discussed above.

Referring again to block 504, if it is determined that the electronic device is not a Bluetooth device (i.e., NO), the method proceeds to block 514 where the wireless connection module 214 authenticates the electronic device. Authentication can include receiving a password from the electronic device. At block 516, it is determined if the electronic device has previously established a connection with the vehicle. For example, as described above, device characteristics (e.g., device ID) received from the electronic device can be used to query the data storage device 208 to determine if the device characteristics data 234 includes data matching the device characteristics for the electronic device.

If the determination at block 516 is YES, the method process to blocks 508 and 510 as discussed above. If the determination at block 516 is NO, the method proceeds to block 518 where the wireless connection module 214 stores the device characteristics of the electronic device at the data storage device 208. Thereafter, the process can continue to blocks 508 and 510 as discussed above.

Referring again to FIG. 3, the prioritization module 216 executable by the processor 204 assigns a priority to each electronic device based on the device characteristics and a priority rules set stored at the data storage device. For example, the device characteristics data 234 and the priority rules set 236 stored at the data storage device 208.

The priority assigned to each electronic device can be a value, for example, any numerical or other kind of value for distinguishing between two or more priority states. For example, in some cases, the priority may be given as a percentage between 0% and 100%, where 0% refers to a low priority and 100% refers to a high priority. In other cases, the priority value could be a value in the range between 1 and 10. In still other cases, the priority value, but could be associated with a given discrete state, such as "high priority", "low priority", "no priority", "extremely high priority", "medium priority".

The priority rules set 236 includes schemas for prioritizing the connections of electronic devices based on the device characteristics and/or a vehicle context. These schemas can be predefined and/or manually defined by user input. The priority rules set 236 is applied by the prioritization module 216 to determine and assign a priority for each electronic device. Table 1, shown below, illustrates an exemplary priority rules set. In Table 1, the value 1 indicates the highest priority, however, it is understood, that in other embodiments, value 1 could indicate a different level of priority (e.g., the lowest priority).

TABLE 1

| Device Characteristics (i.e., Data Type) | Priority |
| --- | --- |
| Health | 1 |
| Activity | 2 |
| Notifications/Alerts | 3 |
| Streaming | 4 |
| Remote Control | 5 |

In some embodiments, the priority rules set can include priority for sub-data types of the data types. For example, a health data type indicating heart rate may have a higher priority than a health data type indicating perspiration rate. Table 2, shown below, illustrates an exemplary priority rules set with sub-data types. In Table 2, the value 1 indicates the highest priority, however, it is understood, that in other embodiments, value 1 could indicate a different level of priority (e.g., the lowest priority).

TABLE 2

| Device Characteristics (i.e., Data Type) | Sub Data Type | Priority |
| --- | --- | --- |
| Health | Heart Rate | 1 |
| Health | Respiration Rate | 2 |
| Health | Perspiration Rate | 4 |
| Activity | Acceleration | 3 |
| Notifications/Alerts | Calendar Notification | 6 |
| Notifications/Alerts | Alarm Alert | 5 |
| Streaming | Audio | 6 |
| Streaming | Video | 7 |
| Remote Control | Infotainment System | 9 |
| Remote Control | HVAC | 8 |

In some embodiments, the method at block 310 can include determining a vehicle context based on information received from one or more vehicle systems of the vehicle. For example, the prioritization module 216 executable by the processor 204 can determine a vehicle context based on information received from one or more vehicle systems and/or sensors 220 of the vehicle 102. The vehicle context can indicate a current vehicle scenario. For example, vehicle ignition ON, vehicle ignition OFF, normal vehicle driving, vehicle traffic, hazardous driving, vehicle occupancy, among others. Thus, in one embodiment, at block 306, assigning the priority to each electronic device is based on the vehicle context, the device characteristics and the priority rules set stored at the data storage device.

Accordingly, in one embodiment, the priority rules set can include schemas for prioritizing electronic devices based on a vehicle context and device characteristics. Table 3, shown below, illustrates an exemplary priority rules set including priority schemas based on vehicle context and device characteristics. In Table 3, the value 1 indicates the highest priority, however, it is understood, that in other embodiments, value 1 could indicate a different level of priority (e.g., the lowest priority).

TABLE 3

| Vehicle Context | Device Characteristic (i.e., Data Type) | Priority |
| --- | --- | --- |
| Vehicle Ignition ON or OFF | Remote Control | 1 |
|  | Notifications/Alerts | 2 |
| Normal Driving | Streaming | 1 |
|  | Activity | 2 |
|  | Health | 3 |
| Heavy Traffic and/or Hazardous Driving | Health | 1 |
|  | Notifications/Alerts | 2 |
| High Vehicle Occupancy | Streaming | 1 |
|  | Activity | 2 |

In another embodiment, the prioritization module 216 can determine and/or assign the priority to each of the plurality of electronic devices based on user input. For example, user input can be received from a driver and/or vehicle occupant via an electronic device associated with the driver and/or vehicle occupant or from a human machine interface in the vehicle. Thus, a user of at least one of the electronic devices can manually set and/or modify the priority of the plurality of electronic devices. Upon receiving the user input, the prioritization module 216 can assign and/or modify a priority of an electronic device.

In some embodiments, assigning a priority to each electronic device based on the device characteristics and a priority rules set stored at the data storage device includes storing the priority in the connection slot list 232 and/or the device characteristics data 234. The priority is associated with the device, for example, the device ID. As mentioned above, the connection slot list 116 manages of all the active devices currently connected to the vehicle 102. In one embodiment, the prioritization module 216 stores the priority of the electronic devices in the connection slot list 232.

Referring back to FIG. 3, the method can also include at block 312 detecting a trigger event. Upon detection of a trigger event, control of data transmission can be effectuated as will be described herein. Accordingly, in one embodiment, if a trigger event is detected (i.e., YES), the method proceeds to block 316. Thus, upon detecting a trigger event at block 312, controlling the data throughput between each electronic devices and the vehicle based on the priority assigned to each of the plurality of electronic devices. Otherwise, the method proceeds to block 314 and the method ends. It is understood that in some embodiments, block 312 can be processed prior to blocks 304 and/or 306.

In one embodiment, the wireless connection module 214 can detect the trigger event based on information received from one or more vehicle systems and/or sensors 220 of the vehicle 102. For example, a trigger event can be detecting a number of electronic devices actively connected to the vehicle meets and/or exceeds a predetermined threshold. For example, the wireless connection module 214, based on the connection slot list 232, can determine a number of electronic devices currently connected to the vehicle 102. If the number of electronic devices currently connected to the vehicle 102 meets and/or exceeds a predetermined threshold (i.e., stored at the data storage device 208), a trigger event is detected to effectuate control of data transmission.

As another example, the trigger event can be based on a current bandwidth usage of the vehicle network. Thus, the wireless connection module 214 can determine a current bandwidth usage of the vehicle network from, for example, data from the communication interface 210 and/or the connection slot list 232. The wireless connection module 214 can compare the current bandwidth usage of the vehicle network to a predetermined bandwidth threshold (e.g., peak usage), stored, for example, at the data storage device 208. If the current bandwidth usage meets and/or the predetermined bandwidth threshold, a trigger event is detected to effectuate control of data transmission.

Thus, at block 316, the method includes controlling data transmission between each electronic device and the vehicle based on the priority. In one embodiment, the wireless connection module 214 executable by the processor 204 can control data transmission between each electronic device and the vehicle based on the priority assigned by the prioritization module 216. Controlling data transmission can include, but is not limited to, increasing and/or decreasing data throughput between each of the plurality of electronic devices and the vehicle, stopping and/or starting data transmission between each of the plurality of electronic devices and the vehicle, transmitting and/or receiving selective data between each of the plurality of electronic devices and the vehicle, and optimizing bandwidth between each of the plurality of electronic devices and the vehicle. It is understood controlling data transmission can be accomplished in various ways, for example removing redundant data messages, data stream management, or sequencing, modifying data compression, changing rules, modes, and/or data transports, among others.

More specifically, controlling data transmission is based on the priority assigned to each of the plurality of electronic devices. For example, controlling data transmission can include increasing data throughput of electronic devices with a higher priority than electronic devices with a lower priority. Thus, the wireless connection module 214 can, in some embodiments, compare the priority of each of the electronic devices to determine which electronic device has a higher priority and control data transmission and/or throughput accordingly. In another example, controlling data transmission can include increasing and/or decreasing data throughput as a function of the priority assigned to each of the electronic devices. In a further embodiment, controlling data transmission can include transmitting data in an order based on the priority assigned to each of the electronic devices. In another embodiment, controlling data transmission can include adjusting data throughput of the electronic devices based on the priority assigned to each of the electronic devices relative to a current bandwidth usage of the vehicle network. Furthermore, in one embodiment, controlling data transmission can include adjusting data throughput of each electronic device as a function of the priority assigned to each electronic device.

It is understood that in some embodiments, the priority assigned to each of the electronic devices can be updated. In some embodiments, the update can occur at blocks 302, 304, and/or 306. In other embodiments, the update can occur after block 316. For example, in one embodiment, the method can further include monitoring the vehicle network for a change in the number of electronic devices connected to the vehicle network and upon determining the change, updating the priority assigned to each of the electronic devices connected to the vehicle network. For example, the wireless connection module 214 executable by the processor 204 can monitor the vehicle network (e.g., requests for connection, changes in the connection slot list 232) for a change in the number of electronic devices connected to the vehicle network. If a change is detected, the prioritization module 216 can determine and assign a priority to each of the electronic devices currently connected to the vehicle as discussed above.

In another embodiment, priority of the electronic devices can be updated based on a data transmission request from the electronic devices. More specifically, the method can include receiving a data transmission request from one or more of the electronic devices, identifying the data type associated with the data transmission request, and updating the priority assigned to each of the electronic devices based on the data type associated with the data transmission request. For example, the wireless connection module 214 executable by the processor 204 can receive a data transmission request from one or more electronic devices. Alternatively, the wireless connection module 214 executable by the processor 204 can monitor the vehicle network for a data transmission request from one or more of the electronic devices. The wireless connection module 214 can identify the data type associated with the data transmission request. For example, the data type can be one of a health data type, an activity data type, a notification data type, a streaming data type, and a remote control data type. Based on the identification of the data type and the priority rules set 236 stored at the data storage device 208, the prioritization module can update the priority assigned to each of the electronic devices.

Illustrative examples of determining and/or assigning priority and managing data transmission based on the priority will now be described with reference to FIGS. 6, 7A and 7B and the priority rules set shown in Table 3 above. As discussed, FIG. 6 represents an exemplary table of device characteristics data 600. FIGS. 7A and 7B illustrate exemplary connection slot lists 702 and 704 including priority values assigned to electronic devices. It is appreciated, that in some embodiments, the priority values could be stored as device characteristics data.

As shown in Table 3, an exemplary vehicle context can include normal driving. Normal driving can be determined based on vehicle data received from vehicle systems and sensors 220. For example, vehicle data such as speed, yaw rate, weather conditions, learned driving information, steering information, among others can be used to determine if a normal driving conditions exists. Based on the vehicle context and data characteristics of each electronic device, and a priority rules set, a priority can be determined and assigned. Thus, according to the priority rules set shown in Table 3, during a normal driving scenario, electronic devices that provide the following data types are assigned a higher priority: streaming data type, activities data type, health data type.

As another example, based on vehicle information received from vehicle systems and sensors 220, the number of vehicle occupants can be determined. If the number of vehicle occupants is high (e.g., as compared to predetermined threshold), a high vehicle occupancy vehicle context is determined. According to Table 3, during high vehicle occupancy, electronic devices that provide the following data types are assigned a higher priority: streaming data type and activities data type.

In FIG. 7A, the priority assigned to each electronic device is based on a normal driving vehicle context described above. Thus, the prioritization module 216 analyzes and compares the device characteristics data 600 for each electronic device and applies the priority rules set for normal driving context to determine a priority for each electronic device. In FIG. 7A, connected device 4S is assigned the highest priority (i.e., 1) because the connected device 4A provides streaming, activity and health data types.

In FIG. 7B, the priority assigned to each electronic device is based on a high vehicle occupancy vehicle context described above. Thus, the prioritization module 216 analyzes and compares the device characteristics data 600 for each electronic device and applies the priority rules set for normal driving context to determine a priority for each electronic device. In FIG. 3B, connected device 3M is assigned the highest priority (i.e., 1) because the connected device 3M provides streaming only. However, in another embodiment, connected device 4S could be assigned the highest priority (i.e., 1) because the connected device 4S provides streaming and activity data types. However, if other device data characteristics are considered, since the user of the connected device 3M is indicated as a Teen and the user of the connected device 4S is indicated as a Senior, streaming content from the connected device 3M may be preferred. Accordingly, the prioritization module 216 can aggregate, average and/or weight different characteristics.

The examples discussed above refer to priority during a normal driving scenario and a high occupancy scenario. As mentioned, other scenarios can be contemplated with predetermined rules (e.g., characteristics, factors) for priority. For example, in an ignition ON or ignition OFF scenario, devices with remote control data types and notification data types may be assigned a higher priority. In a high traffic and/or dangerous driving area, devices with health data types and notification data types maybe assigned a higher priority. It is understood that other vehicle scenarios and other predefined characteristics (e.g., rules, factors) can be implemented for assigning a higher and/or lower priority for a device during said vehicle scenarios.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for managing a plurality of electronic devices with a vehicle, comprising:
    establishing operable connections for computer communication between the plurality of electronic devices and the vehicle in a vehicle network, including each electronic device of the plurality of electronic devices communicating one or more data types to the vehicle, wherein the one or more data types identifies data types that each electronic device of the plurality of electronic devices is capable of transmitting to the vehicle via each of the operable connections between each electronic device of the plurality of electronic devices, wherein the one or more data types are stored at a data storage device;
    determining a current vehicle context of the vehicle based on information received from one or more vehicle systems of the vehicle;
    assigning a priority to each electronic device of the plurality of electronic devices based on the current vehicle context, the one or more data types of each electronic device of the plurality of electronic devices, and a priority rules set stored at the data storage device; and
    upon detecting a trigger event on the vehicle network, controlling data transmission of each of the operable connections between each electronic device of the plurality of electronic devices and the vehicle based on the priority.

2. The method of claim 1, wherein the data types includes at least one of: a health data type, an activity data type, a notification data type, a streaming data type, and a remote control data type.

3. The method of claim 1, wherein controlling data transmission further includes increasing data throughput of electronic devices of the plurality of electronic devices with a higher priority than electronic devices of the plurality of electronic devices with a lower priority.

4. The method of claim 3, wherein controlling data transmission further includes adjusting data throughput of electronic devices of the plurality of electronic devices based on the priority assigned to each electronic device of the plurality of electronic devices relative to a current bandwidth usage of the vehicle network.

5. The method of claim 1, wherein controlling the data throughput between each electronic device of the plurality of electronic devices and the vehicle based on the priority assigned to each electronic device of the plurality of electronic devices.

6. The method of claim 1, wherein detecting the trigger event further includes comparing a current bandwidth usage of the vehicle network to a predetermined bandwidth threshold.

7. The method of claim 1, further including monitoring the vehicle network for a change in a number of the plurality of electronic devices connected to the vehicle network and upon determining the change, updating the priority assigned to each electronic device of the plurality of electronic devices connected to the vehicle network.

8. The method of claim 1, further including receiving a data transmission request from one or more of the plurality of electronic devices, identifying the data type associated with the data transmission request and updating the priority assigned to each electronic device of the plurality of electronic devices based on the data type associated with the data transmission request.

9. A system for managing a plurality of electronic devices with a vehicle, comprising:
    a processor;
    a wireless connection module executable by the processor establishes operable connections for computer communication between each electronic device of the plurality of electronic devices and the vehicle in a vehicle network, wherein the wireless connection module identifies device characteristics for each electronic device of the plurality of electronic devices, the device characteristics including at least one or more data types capable of transmission between each electronic device of the plurality of electronic devices and the vehicle; and a prioritization module executable by the processor determines a current vehicle context based on information received from one or more vehicle systems of the vehicle, and assigns a priority to each electronic device of the plurality of electronic devices based on the device characteristics, the one or more data types, the current vehicle context, and a priority rules set stored at a data storage device, the data storage device operably connected for computer communication to the processor, wherein the wireless connection module executable by the processor controls data transmission between each electronic device of the plurality of electronic devices and the vehicle based on the priority assigned by the prioritization module, wherein the wireless connection module executable by the processor controls data transmission by adjusting data throughput of each electronic device of the plurality of electronic devices as a function of the priority assigned to each electronic device of the plurality of electronic devices.

10. The system of claim 9, wherein the wireless connection module executable by the processor determines a trigger event based on the plurality of electronic devices and a current bandwidth of the vehicle network and upon determining the trigger event, the wireless connection module executable by the processor controls data transmission between each electronic device of the plurality of electronic devices and the vehicle based on the priority assigned to each electronic device of the plurality of electronic devices by the prioritization module.

11. The system of claim 9, wherein the wireless connection module executable by the processor monitors the vehicle network for a data transmission request from one or more of the plurality of electronic devices, identifies the data type associated with the data transmission request and the prioritization module updates the priority assigned to each electronic device of the plurality of electronic devices based on the data type associated with the data transmission request.

12. A non-transitory computer-readable storage medium storing instructions that, when executed by a computer, causes the computer to perform a method comprising:
    establishing operable connections for computer communication between a plurality of electronic devices and a vehicle in a vehicle network, including each electronic device of the plurality of electronic devices communicating one or more data types to the vehicle, wherein the one or more data types identifies data types that each electronic device of the plurality of electronic devices is capable of transmitting to the vehicle via each of the operable connections between each electronic device of the plurality of electronic devices and storing the device characteristics at a data storage device;
    determining a current vehicle context based on information received one or more vehicle systems of the vehicle;
    determining a priority for each electronic device of the plurality of electronic devices based on the current vehicle context, the one or more data types of each electronic device of the plurality of electronic devices, and a priority rules set; and
    controlling data transmission between each electronic device of the plurality of electronic devices and the vehicle based on the priority.

13. The non-transitory computer-readable storage medium of claim 12, wherein the data types includes at least one of: a health data type, an activity data type, a notification data type, a streaming data type, and a remote control data type.

14. The non-transitory computer-readable storage medium of claim 12, wherein controlling data transmission further includes increasing data throughput of electronic devices of the plurality of electronic devices with a higher priority than electronic devices of the plurality of electronic devices with a lower priority.

15. The non-transitory computer-readable storage medium of claim 12, wherein controlling data transmission further includes adjusting data throughput of the plurality of electronic devices based on the priority assigned to each electronic device of the plurality of electronic devices relative to a current bandwidth usage of the vehicle network.

* * * * *